May 30, 1961 YASUSHI HOSHINO ET AL 2,986,609

APPARATUS OF SYNCHRONOUS RECORDING ON A NUMBER OF MAGNETIC RECORDING SHEETS

Filed Oct. 2, 1958 2 Sheets-Sheet 1

May 30, 1961 YASUSHI HOSHINO ET AL 2,986,609

APPARATUS OF SYNCHRONOUS RECORDING ON A NUMBER OF MAGNETIC RECORDING SHEETS

Filed Oct. 2, 1958 2 Sheets-Sheet 2

1

2,986,609

APPARATUS OF SYNCHRONOUS RECORDING ON A NUMBER OF MAGNETIC RECORDING SHEETS

Yasushi Hoshino, 462 1-chome, Tamagawa Okusawa-cho, Setagaya-ku, Tokyo, Japan; Mamoru Namikawa, 664 Kugahara-cho, Ota-ku, Tokyo, Japan; and Shigezo Tochihara, Kanagawa, Japan (531 Matsunoki-Jyutaku, Matsunoki-cho, Suginami-ku, Tokyo, Japan)

Filed Oct. 2, 1958, Ser. No. 764,914

Claims priority, application Japan Nov. 20, 1957

3 Claims. (Cl. 179—100.2)

This invention relates to apparatus for recording sound on more than two magnetic recording sheets at a time by means of a single magnetic sound recording and reading machine thereby producing in a short time a large number of copies of the original.

In order to make copies of a magnetic recording sheet, for instance, a sheet having musical notes printed on its front surface and magnetic film on its back surface on which the corresponding musical sound is recorded, a copy is first made on a magnetic recording tape or sheet from the original and then this copy is used as a master sheet from which copies are made. As a method of making copies, there is employed the contact printing in which the original sheet is placed on a raw sheet in such a manner that the magnetic films of the two sheets are pressed to contact each other and, after a magnetic field having suitable intensity is applied thereto, the intensity is gradually attenuated to zero.

The duplicate thus obtained does not have as large an output for reproducing sound as the master sheet, due to the fact that the sound recording level of the master sheet is lowered in the applied field by some demagnetization and also the printing capability is somewhat low. This method is of course useful for making copies simply to be used in office work, but is inadequate to produce reprints having high fidelity and high output level. The present invention eliminates such defects completely and produces in a short time copies having high fidelity and high output level and excelling in specific characteristic of signal in relation to noise and in frequency characteristic.

In order that the invention may be fully understood, it will now be described with reference to the accompanying drawings, in which.

Figures 1, 2, 13:
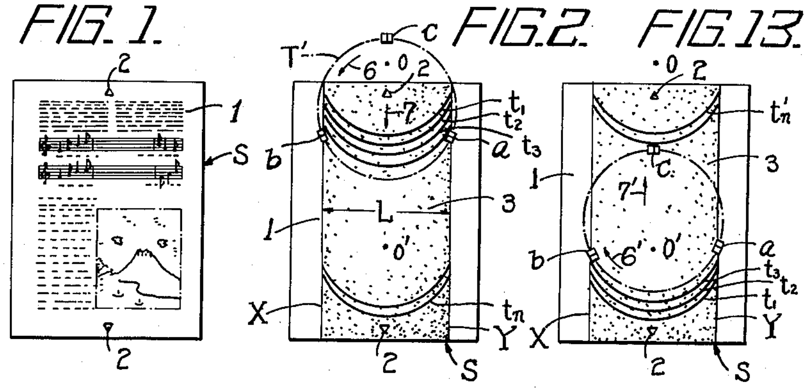
Fig. 1 shows the front surface of a magnetic sound recording sheet.
Fig. 2 shows the back surface of the same.
Fig. 13 shows the back surface of the sheet.

Referring to Fig. 1, a magnetic sound recording sheet S made of paper 1 or the like has or will have description and/or drawings on the front surface. Holes 2, 2 for setting or positioning the sheet are adapted to engage with guide pins fitted on the machine in the specified position. Fig. 2 illustrates the back surface of the sheet S on which a magnetic sound recording film 3 is coated between parallel lines X, Y. The width L of the film 3 is equal to the distance *a*—*b*, *b*—*c*, *c*—*a* between the heads of a turntable T indicated with a broken line.

According to the invention, a plurality (in this instance three) of turntables are used. Each of these turntables has a plurality (in this instance three) of sound recording or reproducing heads *a*, *b*, *c* which are fixed with their gaps upward on the circumference equidistantly from each other. Each head is constructed to be movable in the vertical direction without being cause to oscillate laterally, and to be pressed upwardly by a spring. The sheet S is provided on the back surface with a magnetic film 3 and a head gap fixed on the turntable T is adapted to come into contact with the magnetic film 3. When sound modulated current is applied to the heads while the turntable rotating in the direction of the arrow 6 is shifted in the direction of the arrow 7, sound tracks $t_1$, $t_2$, $t_3$ are formed one after another on the magnetic film till the last track $t_n$ is produced at the end of the sheet, as illustrated in Fig. 2.

Figure 3:
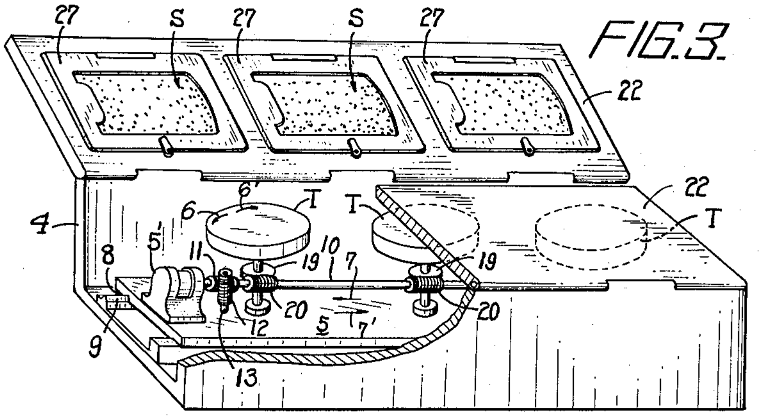
Fig. 3 is a perspective view, partly broken away, of the magnetic sound recording and reading machine.
Figures 4, 6, 7:
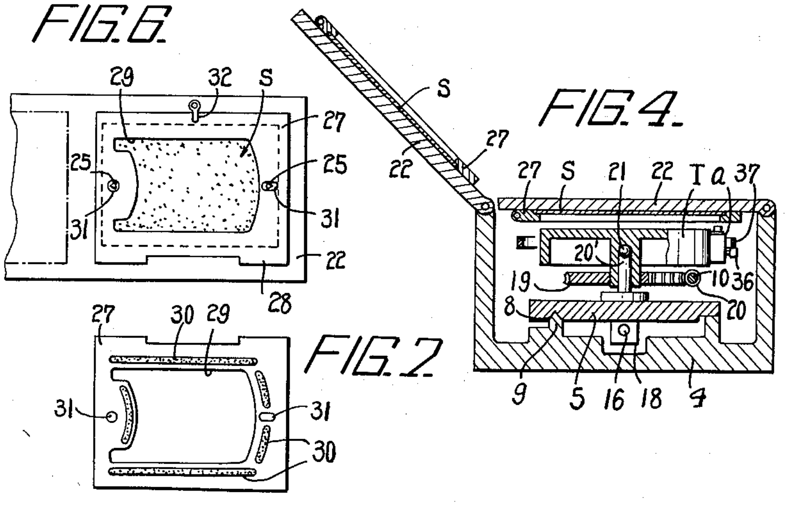
Fig. 4 is a cross-sectional side view of Fig. 3.
Fig. 6 shows the upper surface of a pressing plate.
Fig. 7 is a plan view of the same.
Figure 5:
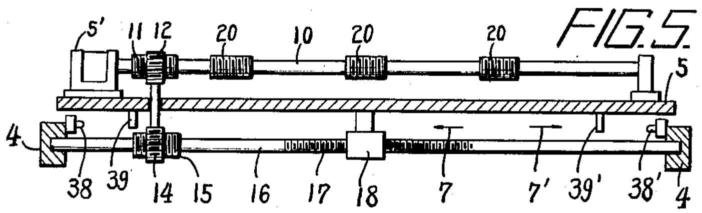
Fig. 5 is a cross-sectional view showing, by way of example, a driving system in the machine of Fig. 3.

In Figs. 3 and 4, 4 designates the casing of the apparatus. A shiftable plate 5 is adapted to slide in cooperation with a groove 8 provided in the plate 5 and a contact support 9 of the casing 4. The sliding motion of the plate 5 is effected by rotation of a motor 5′. As shown in Fig. 5, a shaft 13 is rotated through a gearing 11, 12 mounted on a shaft 10 connected to the motor shaft. The shaft 13 drives through a gearing 14, 15 a shaft 16 having a helical gear 17 which is engaged with a nut 18 secured integrally to the plate 5. In this way, the displacement of the shiftable plate 5 is effected in the linear direction of the arrow 7 or in the opposite direction 7′ along the groove 8 and the support 9 by rotation of the motor 5′.

The rotation of the turntable will now be described. Each of the turntables T, T, T has a gear wheel 19 as its integral part. This wheel 19 is in engagement with a worm 20 provided on the shaft 10 so that the turntables rotate simultaneously in the direction of the arrow 6 or in the opposite direction 6′ by rotation of the motor 5′. In Fig. 4, 20′ is a bearing mounted on the plate 5 on which the turntable is carried, and a steel ball 21 is provided for making the rotation of the turntable smooth.

As described above, each turn table T is so arranged that it is rotated by the rotation of the motor 5′ in the direction of the arrow 6 or the opposite direction 6′ and at the same time shifted in the linear direction of the arrow 7 or the opposite direction 7′ with the same speed in either direction. 22 (Fig. 4) designates a pressing plate and a magnetic sound recording sheet S is removably fixed on the back surface of the plate 22 as hereinafter described.

Fig. 6 illustrates how to set the sheet S on the pressing plate 22, the sheet being shown with its magnetic film upward, element 25 being a guide pin fixed on the pressing plate 22 thereby placing the sheet S in the predetermined position. 26 (Fig. 8) is a thin, soft rubber or plastic sheet which serves as cushion to better the contact of the film with the sound recording head. 27 indicates a pressing plate hinged at 28 so that it opens and closes for setting or removal of the sheet S with relation to the pressing plate 22.

The sheet S is thus secured between the pressing plates 22, 27. A window is made in the pressing plate 27, so that the magnetic film has exposed a part corresponding to the window. In Fig. 7, 30 is a cushion made of material such as sponge rubber which acts to hold the sheet fast in its position against any external force applied to the sheet interposed between the pressing plates 22, 27. 31 is a hole into which a guide pin 25 is fitted. 32 (Fig. 6) is a turning clamp for insuring the closure of the pressing plate 27.

In place of the plates 27 for pressing the sheets there may be used one plate common to all sheets in like manner as the plate 22 in Fig. 3, which opens and closes in relation to the plate 22 by means of a hinge. In addition to the pressing plates 22, 27, these plates may be provided on the other side of the casing 4 as shown in Figs. 3 and 4 whereby one side can be used for sound recording while the setting of sheets is carried out on the other side. Thus, after the sheets on one side are recorded upon and lifted, the other side is turned down to make recording on new sheets, so that the apparatus may work continuously. By such alternate operation, the apparatus can be used effectively without loss of time for changing the recorded sheet for new one.

Figure 8:
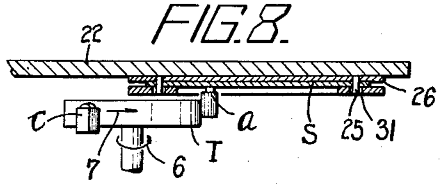
Fig. 8 is a cross-sectional view showing the heads, sheet and pressing plate at the time of recording or reproducing sound.

Fig. 8 illustrates the scanning system of the apparatus, wherein the turntable T has three sound recording heads *a*, *b* (not shown) and *c* of which one head (in this instance *a*) is in contact with the magnetic film of the sheet S. When sound modulated current is applied to the head, the turntable is rotated in the direction of the arrow 6 and at the same time shifted in the direction of the arrow 7 thereby forming the sound tracks $t_1$, $t_2$, as is apparent in Fig. 2 showing also a locus T' of the center of the head gap with a broken line.

Figure 9:
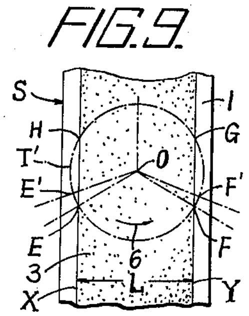
Fig. 9 is a partial plan view of the sheet.

Fig. 9 illustrates a part of the sheet S in which the magnetic film 3 is coated on paper 1 between parallel lines X, Y and the width L of said film is equal to a distance between the heads *a*, *b*, *c*. If O represents the center of a scanning locus T' of the sound recording heads and the locus T' intersects the lines X, Y at E, F, G, H, the sound recording must be effected between E and F and not between G and H, otherwise arc tracks $t_1$, $t_2$ . . . $t_n$ (Fig. 2) will not be formed systematically from the left end to the right end of the film. If the scanning is carried out in the direction of the arrow 6 and the head is so arranged that it comes first into contact with the paper 1 at E' and after forming a track between E and F, leaves the sheet at F', the required arc track will be formed between E and F. For this purpose, heads illustrated in Figs. 10 and 11 are used.

Figure 10:
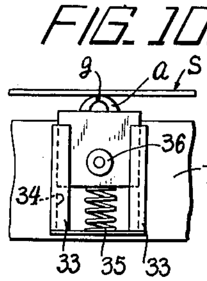
Figs. 10 and 11 are partial front views showing the relation between the head and the sheet.
Figure 11:
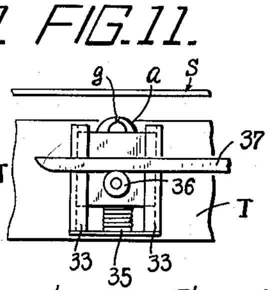

In Figs. 10 and 11, the head *a* of the turntable is adapted to move vertically between guide grooves 34 provided in posts 33 supporting the head. The head is always urged upwardly by a spring 35. As shown in Fig. 10, the sound recording is effected when the head gap *g* is in contact with the magnetic film coated on the back surface of the sheet S, namely, when the head is positioned between E' and F' via E and F (Fig. 9). But, once the head turns from F' to E' via G and H, the head gap *g* is adapted to be kept away from the sheet S by action of a roll 36 rotatably fitted to the head *a*, since the roll is pressed down by a metal element 37 having a semicircular point when the head moves counterclockwise. This metal element is provided around the periphery of the turntable by about 240° (not shown). Thus, the sound recording can be effected on the magnetic film from E to F.

For current control in the driving system as shown in Fig. 5, a microswitch 38 is mounted on the casing 4. When the shiftable plate 5 is moved leftward and a projection 39 fitted thereto presses said microswitch, the motor 5' is brought to a stop so that the recording can be started at a predetermined position. With the progress of recording, another projection 39' of the plate 5 pushes a microswitch 38' to cause the motor to stop. In this way, the tracks $t_1$, $t_2$ . . . $t_n$ are formed as illustrated in Fig. 2.

Figure 12:
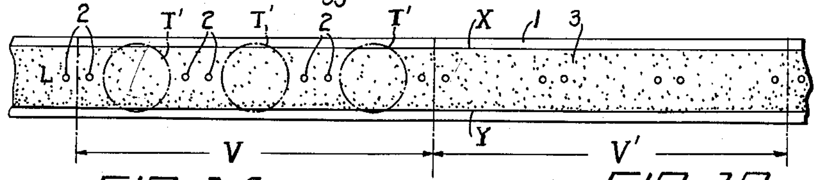
Fig. 12 is a plan view of a continuous sheet.

In place of individual sheets used for the turntable in the apparatus shown in Fig. 3, a long sheet as illustrated in Fig. 12 may be used in a manner such that the magnetic film 3 having a width L is formed on a paper 1 between parallel lines X, Y and the recording is carried out first on the length V corresponding to the length of the casing 4 and then on the next length V' after the sheet is shifted leftward.

On this long sheet there may be made marks to indicate accurate positions of guide holes to be later perforated. These marks may be used as guides for the cutting of the recorded sheet into the final pieces. The apparatus may be provided with a feed device for setting the sheet in the required position and replacing the recorded sheet-length V by the next sheet-length V'.

The rotation of the turntable and the displacement of the shiftable plate can be effected with high or low speed. Thus, for instance, in recording sound from a tape recorder, the feed speed is, say, four times the normal speed and the turntable in the apparatus is rotated and shifted at a speed of four times the normal rate, by which a number of copies can be produced in a very short time with high efficiency. For reproducing sound tracks thus formed on the sheet, the scanning is carried out at a speed which is a quarter of the speed with which the tracks were made, whereby the recorded items such, for instance, as speech and music will be heard in normal tone.

According to the invention the sound recording may be made in various ways. The sound recorded through a microphone may be amplified thereby to make many copies at one time by using all turntables. An output produced by a tape recorder may be utilized. Furthermore, it is possible that an electric circuit is so formed as to cause a turntable to operate as a reproducer of the sound and the sound is reproduced by putting on said turntable a sound record sheet made by the magnetic sound recording and reading machine, the output thus produced being utilized by other turntable as duplicators to make copies of the original sound.

Figure 14:
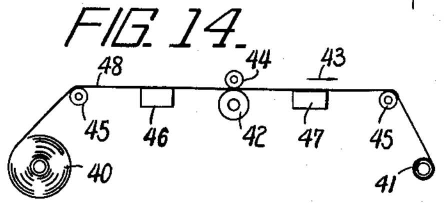
Figs. 14 and 15 are front views showing the essential parts of a tape recorder for making a copy of the original sheet.
Figure 15:
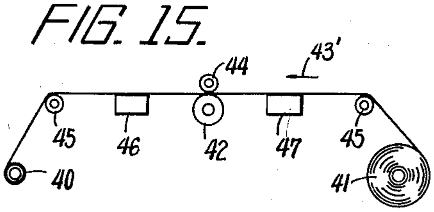

Figs. 14 and 15 show diagrammatically a tape recorder in which 40 is a reel on which a recorded tape has been wound, 41 a winding reel, 42 a capstan for forwarding the tape in the direction of the arrow 43, 44 a pinch roll which presses the tape down on the capstan, 45, 45 guide posts and 46, 47 sound recording heads of which a head 46 is used for reproduction in this instance while a head 47 is arranged to lie idle.

In operation, the tape runs in the direction of the arrow 43 and at the same time the turntable T is started from its center O, rotating in the direction of the arrow 6 as illustrated in Fig. 2. Then, by applying the output of the tape recorder to the heads *a*, *b*, *c* of the sheet recorder i.e. turntables, sound tracks $t_1$, $t_2$, $t_3$ . . .$t_n$ will be formed on the magnetic film of a sheet 3. When the recording is over, the tape is wound from the reel 40 on the reel 41 as shown in Fig. 15 and the center of the turntable is changed from O to O' as in Fig. 13. In this way, the sound recording is effected on a sheet as shown in Fig. 2.

If a number of copies having the same recorded sound are made from said tape, it takes generally some period of time to wind off the tape from the reel 41 onto the reel 40 of Fig. 15 and also to return the sheet recorder from the center O' to the starting center O of Fig. 13 and after the same position as in the first recording is resumed and the recorded sheet is replaced by a new one, the recording will be started again.

In such repetition it requires a lot of time to rewind the tape and to return the turntable to its starting position so that in the production of a great number, say, some hundreds of copies, a large loss of time is invited with a resulting decrease in duplication efficiency.

According to the invention, the sound recording for making a number of copies is carried out rapidly with high efficiency, without requiring time for winding off of the tape or return of the turntable to its starting position.

When the recording is over as shown in Fig. 2 and the turntable comes to the center O′, i.e. the condition of the tape recorder is just as shown in Fig. 15, a new sheet is put on the sheet recorder and then the tape 48 is caused to run in the direction of the arrow 43′. At the same time sound current is applied to a head 47 of the sheet recorder whereby the recording is effected by the reverse rotation of the turntable in the direction of the arrow 6′ with its movement in the direction of the arrow 7′, thus forming sound tracks $t_{1'}$, $t_{2'}$, $t_{3'}$, . . . $t_{n'}$, in order from the bottom toward the top as shown in Fig. 3. Though the running direction of the tape, the rotation of the turntable and the displacement of its center are in the reverse order, the produced sheet of Fig. 13 is the same as that of Fig. 2 so that perfect reproduction of the sound can be effected by scanning the tracks from the top down to the bottom.

The apparatus of the invention has therefore advantages in that troublesome operations for rewinding of the tape and return of the turntable to its starting position and the time required therefor can be dispensed with and a great number of copies can be made from a single tape with high efficiency.

The operation time may be much shortened if the recording is carried out by means of a sheet recorder in which the speed of the rotation and shift of the turntable is increased by four times in relation to a tape having the sound recorded at a speed of 7″/sec.

In the above embodiment, a tape recorder is used as a source of sound output for reproducing the original sound on a sound recording sheet. In place of the tape recorder, the magnetic sound recording and reading machine, a sound film projector, a gramophone record or the like can be used. Also, the sound output produced by the reverse rotation may be utilized for the purpose.

If metal foils are attached to both the beginning and the end of the tape used and thereby the start and the end of the parent sound are converted to electric signals, the output of such signals may be used to cause the sheet recorder to start or stop. By such arrangement the automatic operation is advantageously carried out.

Figure 16:
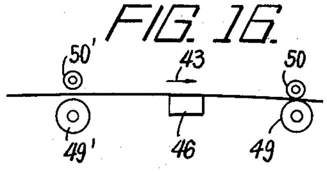
Figs. 16 and 17 are similar views showing the essential parts of a tape recorder capable of rotating in both normal and reverse directions.
Figure 17:
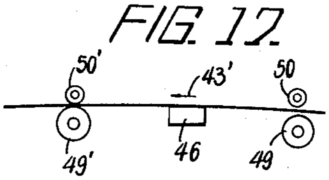

Instead of a tape recorder as illustrated in Figs. 14 and 15, a tape recorder of the type as shown in Figs. 16 and 17 may be used, in which a capstan 49 and a pinch roll 50 are adapted to operate when the tape moves in the direction of the arrow 43, while on the other hand a capstan 49′ and a pinch roll 50′ remain inactive, and when the tape runs in the opposite direction 43′, the capstan 49 and the pinch roll 50 become inactive and the capstan 49′ with the pinch roll 50′ comes into operation. Thus, a magnetic tape recorder equipped with a reproducing head and two sets of tape-feeding mechanisms which are adapted to operate alternately, may serve the purpose of the invention. Such tape recorder is preferably provided with a means by which said tape-feeding mechanisms are automatically changed over to each other in linkage with the tape-running direction.

As described, the turntable used in the invention is capable of rotating and shifting in normal and opposite directions and thus the recording is also effected reversely, so that a great number of copies can be advantageously obtained with high efficiency.

What is claimed is:

1. Apparatus for recording sound synchronously on a number of magnetic sound record sheets each having a magnetic coating film, comprising a casing, a support plate slidably mounted in said casing, a plurality of turntables rotatably mounted on said support plate, sound transducer heads mounted on the turntables and spaced by a distance equal to the width of the magnetic coating films of the sound record sheets, a rotatable rod mounted on the support plate, gear means coupling said rod with the turntables to rotate the same simultaneously, a second rod rotatably mounted on the casing and having a helical thread in engagement with the support plate thereby to displace the support plate, a motor coupled to one of said rods for driving the rotatable rod on the support plate and also the second rod rotatably mounted on the casing, a gear system connecting the two rods, a cover plate, and pressing frames operatively associated with said cover plate in each position corresponding to one of the turntables on the support plate in the casing to hold a magnetic sound record sheet between the cover plate and the pressing plate in each such position.

2. Apparatus according to claim 1, comprising cover plates, including the first said cover plate, hinged on opposite sides of the casing, whereby when one cover plate is in operation, the other cover can be prepared for the succeeding operation.

3. Apparatus according to claim 1, comprising, on said frames, cushions of an elastic material in positions corresponding to the edges of a magnetic sound record sheet to be inserted between the cover plate and the pressing frames.

References Cited in the file of this patent

UNITED STATES PATENTS

| | | |
|---|---|---|
| 2,560,234 | Masterson | July 10, 1951 |
| 2,622,155 | Dutton | Dec. 16, 1952 |
| 2,743,318 | DeForest | Apr. 24, 1956 |
| 2,856,462 | Lyon | Oct. 14, 1958 |
| 2,924,668 | Hoshino, et al. | Feb. 9, 1960 |